(12) United States Patent  
Shimazu

(10) Patent No.: US 6,381,539 B1  
(45) Date of Patent: Apr. 30, 2002

(54) PREFERENCE INFORMATION COLLECTION SYSTEM, METHOD THEREFOR AND STORAGE MEDIUM STORING CONTROL PROGRAM THEREFOR

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/670,724

(22) Filed: Sep. 27, 2000

(30) Foreign Application Priority Data

Oct. 13, 1999 (JP) .......................................... 11-290379

(51) Int. Cl.$^7$ .......................... G01C 21/00; G06F 15/00
(52) U.S. Cl. ....................... 701/213; 701/202; 701/204; 340/990
(58) Field of Search ................................. 701/213, 202, 701/204, 209, 210, 211, 214; 340/990, 995; 342/357.08, 357.1, 357.13

(56) References Cited

U.S. PATENT DOCUMENTS 5,272,638 A * 12/1993 Martin et al. ................ 701/201
5,568,390 A * 10/1996 Hirota et al. ................ 701/207

* cited by examiner

Primary Examiner—Tan Nguyen
(74) Attorney, Agent, or Firm—Scully, Scott, Murphy & Presser

(57) ABSTRACT

A preference information collection system is capable of automatically obtain preference information of user. The preference information collecting system is adapted for detecting staying of terminal equipment which is movable and position information of which is obtainable and collecting preference information of a user of the terminal from kind of a site where the terminal equipment stays. The system includes a correspondence table storing a physical position of the site, type of a shop presenting on the site, a preliminarily set minimum time required for regarding that the terminal equipment stays the site, and the latest information of number of times of stay of the terminal equipment at the site, with correspondence thereof. A preference detection device compares a period from detection of the stay start condition by the stay condition detection device to detection of the moving start condition of the moving condition detection device and a value of the minimum time of the correspondence corresponding to a current position indicated by the position identifying device, and updating the latest information of number of times of stay of the correspondence table corresponding to a current position indicated by the position identifying device depending upon a result of comparison.

16 Claims, 9 Drawing Sheets

FIG.2

CORRESPONDENCE TABLE

| SHOP POSITION PORTION | SHOP NAME PORTION | MINIMUM STAY TIME PORTION | STAY TIMES PORTION | TYPE PORTION |
|---|---|---|---|---|
| LATITUDE X1, LONGITUDE Y1 | HAMBURGER SHOP A | 10 MIN | 15 | RESTAURANT |
| LATITUDE X2, LONGITUDE Y2 | TENNIS COURT B | 30 MIN | 2 | SPOT |
| LATITUDE X3, LONGITUDE Y3 | GAME CENTER C | 10 MIN | 7 | PLAY HALL |
| LATITUDE X4, LONGITUDE Y4 | FRENCH RESTAURANT D | 60 MIN | 5 | RESTAURANT |

1a, 1b, 1c, 1d, 1e, 1f

| PLACE | SHOP |
|-------|------|
| P 1 | PLAY HALL |
| P 2 | SPORTING FACILITY |
| P 3 | SHOPPING MALL |

FIG. 7

| TYPE NAME | STAY TIMES ACCUMULATION |
|---|---|
| RESTAURANT | 2 0 |
| SPORT | 2 |
| PLAY HALL | 7 |

STAY TIMES ACCUMULATING PORTION

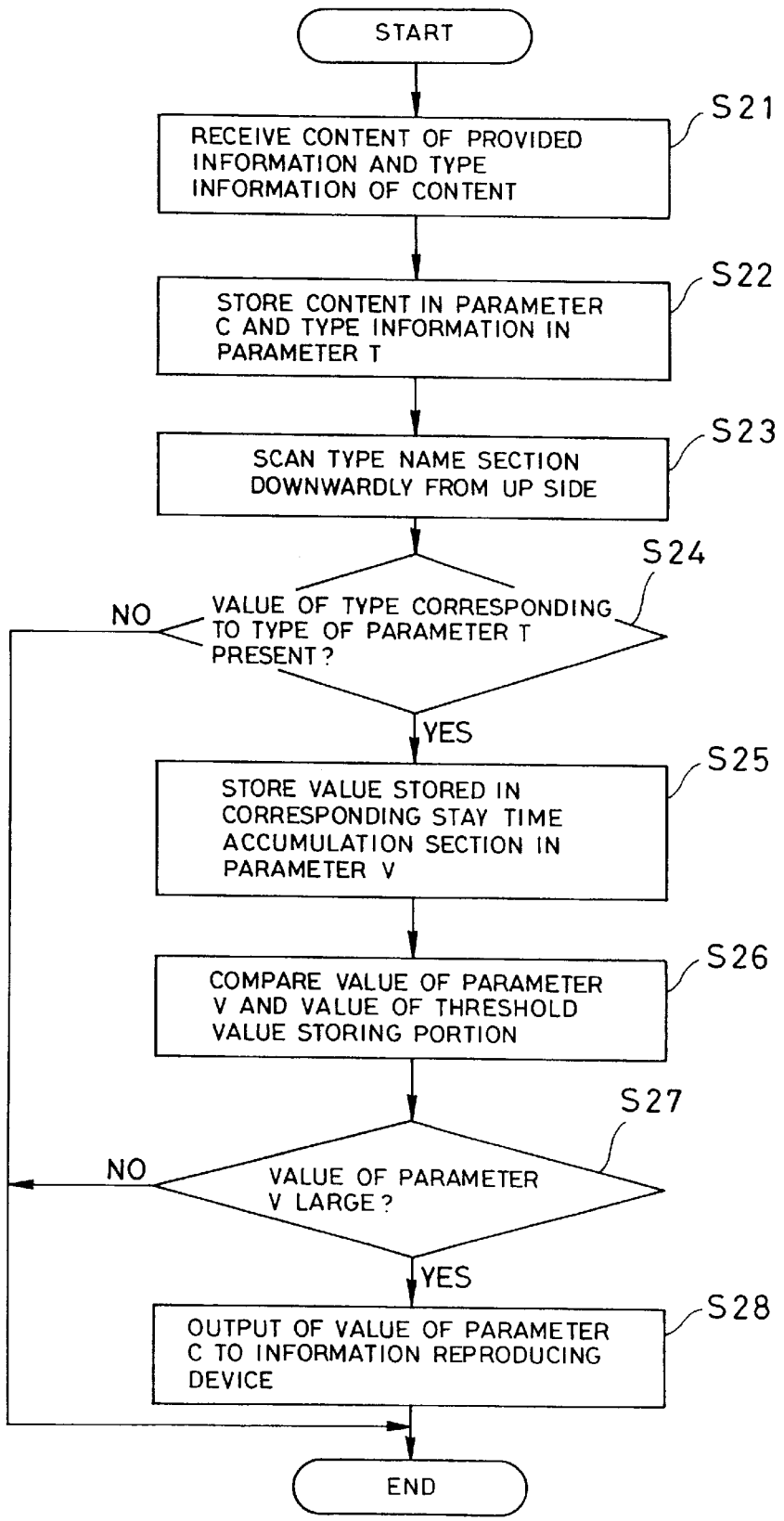

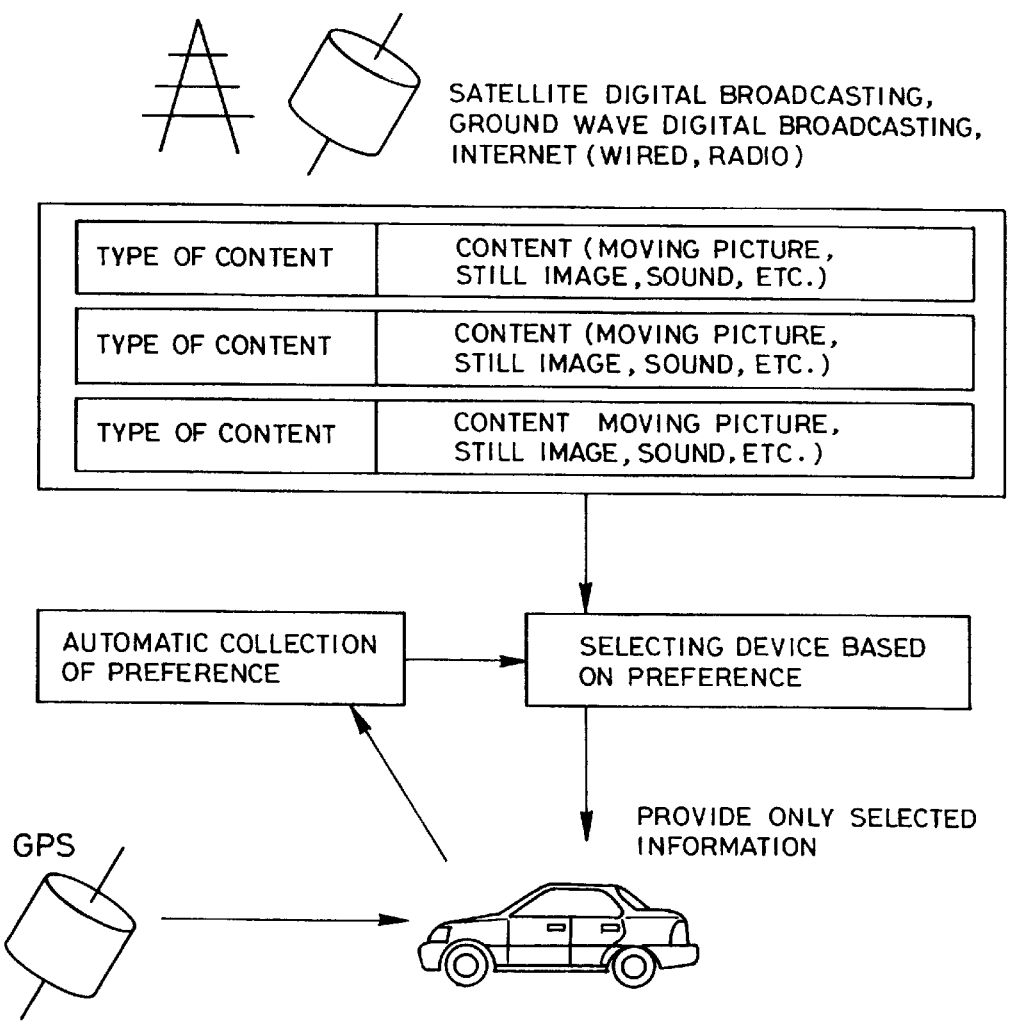

PREFERENCE INFORMATION COLLECTION SYSTEM, METHOD THEREFOR AND STORAGE MEDIUM STORING CONTROL PROGRAM THEREFOR

BACKGROUND OF THE INVENTION

1. Field of the Invention

The present invention relates generally to a preference information collection system, a method therefor and a storage medium storing a control program. More particularly, the invention relates to a system and a method for automatically obtaining preference or attribute of user necessary for selection of information required by the user of automotive vehicle.

2. Description of the Related Art

A vehicular navigation system to be used in an automotive vehicle has been widely spreading. In the vehicular navigation system, a position of own vehicle is identified by a Global Positioning System (GPS), information of the own vehicle position is mapped on a map information, and a route from the current own vehicle position and a destination is retrieved for presenting a route information to a vehicular driver.

As an advanced system of the vehicular navigation system set forth above, there is a navigation system having a communication function. Such system takes information of restaurant, play spot or so forth into the navigation system through a portable telephone, car telephone or the like. In such vehicular navigation system, information services dedicated for providing information to vehicular driver have been provided by a plurality of companies in nowadays.

Shop information and so forth have been stored in software provided in form stored in CD (Compact Disc) or DVD (Digital Versatile Disc). However, such information is variable, the navigation system obtaining information through communication is advantageous for information presented being most recent information.

In case of a user of internet through a desktop type personal computer (PC), it is typically performed to retrieve desired information through various search engines.

In the conventional vehicular navigation system with a communication function, it should be difficult for the vehicular driver to select information beneficial or necessary while driving the vehicle. In order to solve the problem set forth above, in case of the internet, by declaring condition of necessary information by defining preference of the user in advance, there has been proposed a method for presenting only information adapting to the declared condition from information transmitted through the internet. Such technology has been called as PUSH technology. However, in this case, the user has to define own preference by the user.

SUMMARY OF THE INVENTION

The present invention has been worked out for solving the above-mentioned problem set forth above. It is therefore an object of the present invention is provide a preference information collection system, a method therefor and a storage medium storing a control program, which can automatically obtain preference information of user.

Another object of the present invention is to provide a preference information collection system, a method therefor and a storage medium storing a control program, which can selectively provide necessary information from information source of internet, digital broadcasting or the like.

According to the first aspect of the present invention, a preference information collecting system adapted for detecting staying of terminal equipment which is movable and position information of which is obtainable and collecting preference information of a user of the terminal from kind of a site where the terminal equipment stays, comprises:

- a correspondence table storing a physical position of the site, type of a shop presenting on the site, a preliminarily set minimum time required for regarding that the terminal equipment stays the site, and the latest information of number of times of stay of the terminal equipment at the site, with correspondence thereof;
- a position identifying device detecting a current position of the terminal equipment;
- a stay condition detection device detecting a stay start condition of the terminal equipment;
- a moving condition detection device detecting moving start condition of the terminal equipment; and
- a preference detection device comparing a period from detection of the stay start condition by the stay condition detection device to detection of the moving start condition of the moving condition detection device and a value of the minimum time of the correspondence corresponding to a current position indicated by the position identifying device, and updating the latest information of number of times of stay of the correspondence table corresponding to a current position indicated by the position identifying device depending upon a result of comparison.

In the preferred construction, the position identifying device may be constructed with a receiver of one of a global positioning system and a positioning system comparable with the global positioning system. The terminal equipment may be mounted on an automotive vehicle. The stay condition detection device may detect stay start condition of the terminal equipment from one of rotating condition of vehicular wheel and ON and OFF condition of an automotive engine. The moving start condition detection device may detect stay start condition of the terminal equipment from one of rotating condition of vehicular wheel and ON and OFF condition of an automotive engine.

The preference information collecting system may further comprise:

- a stay times accumulating portion accumulating a stay times corresponding to a type of the shop in the correspondence table and recording an accumulated stay times per type of the shop;
- an information providing device receiving a pair of a contents at least including still image, moving picture and sound and a type of the shop of the content and providing information through a communication path;
- a threshold value storing portion storing a preliminarily set minimum number of an accumulated number of times of stay;
- an information filter responsive to the pair of the content and the type of the shop of the content from the information providing means for outputting the content depending upon a result of comparison between number of times of stay in the stay times accumulating portion corresponding to the type of the shop and a value of the threshold value storing portion; and
- an information reproducing device receiving an output of the information filter and presenting information to the user.

The information providing device may receive the content using at least one of a ground wave digital broadcasting, a satellite digital broadcasting, a wired internet, a radio internet.

According to the second aspect of the present invention, a preference information collecting method adapted for detecting staying of terminal equipment which is movable and position information of which is obtainable and collecting preference information of a user of the terminal from kind of a site where the terminal equipment stays, comprises:

a step of providing a correspondence table storing a physical position of the site, type of a shop presenting on the site, a preliminarily set minimum time required for regarding that the terminal equipment stays the site, and the latest information of number of times of stay of the terminal equipment at the site, with correspondence thereof;

a step of making judgment whether the terminal equipment enters into stay start condition;

a step of detecting a current position of the terminal equipment upon entry into stay start condition of the terminal equipment;

a step of retrieving the correspondence table with a current position of the terminal equipment;

a step of detecting moving start condition of the terminal equipment;

a step of comparing a period from detection of the stay start condition by the stay condition detection device to detection of the moving start condition of the moving condition detection device and a value of the minimum time of the correspondence corresponding to a current position indicated by the position identifying device; and a step of updating the latest information of number of times of stay of the correspondence table corresponding to a current position indicated by the position identifying device depending upon a result of comparison.

The step of detecting the current position of the terminal equipment may detect the current position of the terminal equipment on the basis of information from one of a global positioning system and a positioning system comparable with the global positioning system. The terminal equipment may be at least mounted on an automotive vehicle. The step of detecting stay start condition may detect stay start condition of the terminal equipment from one of rotating condition of vehicular wheel and ON and OFF condition of an automotive engine. The step of detecting moving start condition may detects stay start condition of the terminal equipment from one of rotating condition of vehicular wheel and ON and OFF condition of an automotive engine.

The preference information collecting method may further comprise:

a step of accumulating a stay times corresponding to a type of the shop in the correspondence table and recording an accumulated stay times per type of the shop upon receiving a pair of a contents at least including still image, moving picture and sound and a type of the shop of the content and providing information through a communication path, and retrieving a stay times accumulating portion recording number of times of stay per shop in the correspondence table by a type of the shop of the content;

a step of comparing a stay times retrieved from the stay times accumulating portion with a preliminarily set minimum number of an accumulated number of times of stay;

a step of outputting the content depending upon a result of comparison.

The content may be received using at least one of a ground wave digital broadcasting, a satellite digital broadcasting, a wired internet, a radio internet.

According to the third aspect of the present invention, a storage medium storing a preference information collection control program for operating a preference information collecting system adapted for detecting staying of terminal equipment which is movable and position information of which is obtainable and collecting preference information of a user of the terminal from kind of a site where the terminal equipment stays, the preference information collecting system providing a correspondence table storing a physical position of the site, type of a shop presenting on the site, a preliminarily set minimum time required for regarding that the terminal equipment stays the site, and the latest information of number of times of stay of the terminal equipment at the site, with correspondence thereof, the preference information collection control program operating the preference information collecting system for making judgment whether the terminal equipment enters into stay start condition;

for detecting a current position of the terminal equipment upon entry into stay start condition of the terminal equipment;

for retrieving the correspondence table with a current position of the terminal equipment;

for detecting moving start condition of the terminal equipment;

for comparing a period from detection of the stay start condition by the stay condition detection device to detection of the moving start condition of the moving condition detection device and a value of the minimum time of the correspondence corresponding to a current position indicated by the position identifying device; and for updating the latest information of number of times of stay of the correspondence table corresponding to a current position indicated by the position identifying device depending upon a result of comparison.

The preference information collecting control program may also operate the preference information collection system for accumulating a stay times corresponding to a type of the shop in the correspondence table and recording an accumulated stay times per type of the shop upon receiving a pair of a contents at least including still image, moving picture and sound and a type of the shop of the content and providing information through a communication path, and retrieving a stay times accumulating portion recording number of times of stay per shop in the correspondence table by a type of the shop of the content;

for comparing a stay times retrieved from the stay times accumulating portion with a preliminarily set minimum number of an accumulated number of times of stay; and for outputting the content depending upon a result of comparison.

Namely, the preference information collecting system according to the present invention includes the correspondence table storing physical position (latitude and longitude) of destination of the user to visit, such as tennis court, shopping mall, game center and so forth, and name of the shop, and a receiver device of a device, such as GPS or pseudollite.

By this, once the current position (latitude and longitude) of the user terminal can be known by the GPS or the like, what shop the user is staying can be easy seen through retrieval of the correspondence table. Accordingly, it can be seen how many times the user visit the shop. Therefore, the preference information of the user can be obtained automatically.

On the other hand, the preference information collecting system according to the present invention has the information providing device, such as the satellite digital broadcasting, the ground wave broadcasting, data broadcasting, internet (wired or radio) and so forth. The information provided by the information providing device is added type of the content. When the user received the information, only information adapted to the preference of the user can be selected and provided to the user using the preference information obtained through the correspondence table.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 2 is an illustration showing a construction of a correspondence table stored in a memory of FIG. 1;

FIG. 7 is an illustration showing a construction of stay times integrating portion;

FIG. 8 is a flowchart showing process operation of information filter; and

FIG. 9 is an illustration showing operation of another embodiment of the present invention.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
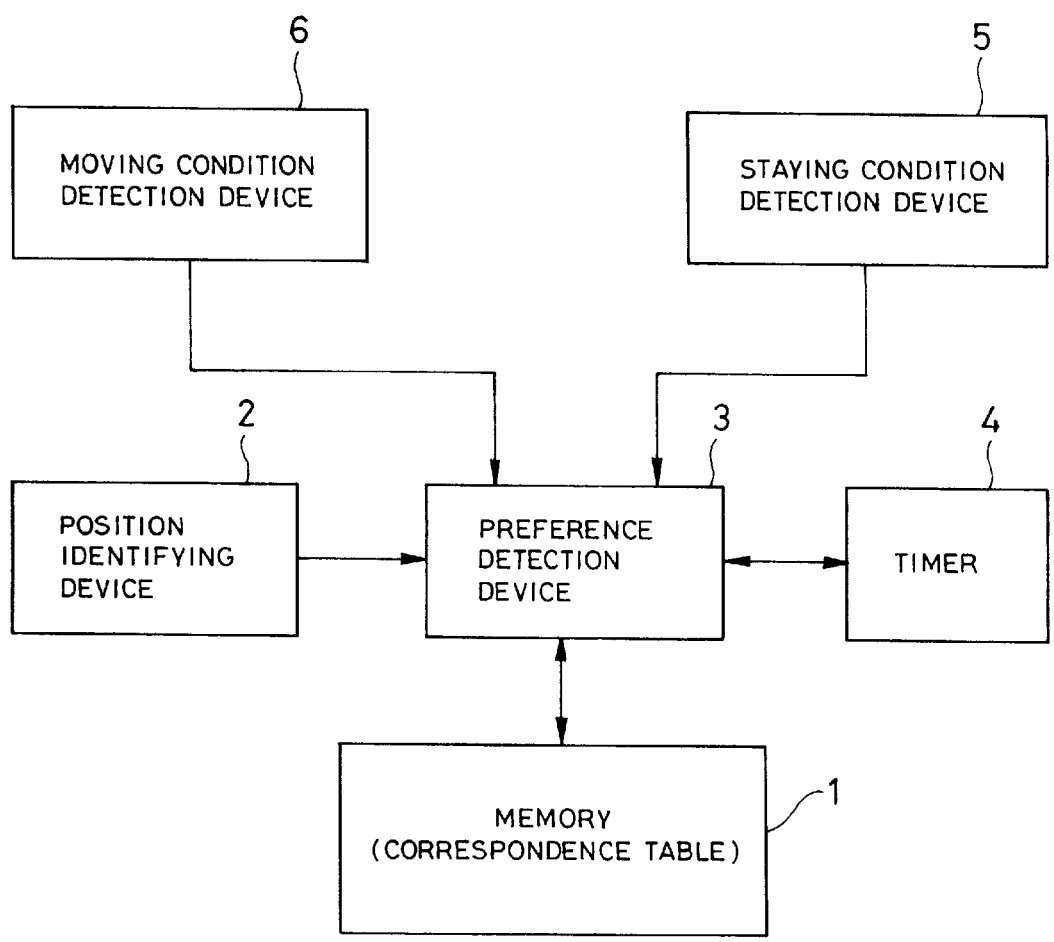
FIG. 1 is a block diagram showing a construction of one embodiment of a preference information collection system according to the present invention.

FIG. 1 is a block diagram showing a construction of one embodiment of a preference information collection system according to the present invention. In FIG. 1, one embodiment of the preference information collection system according to the present invention is constructed with a memory (correspondence table) 1, a position identification device 2, a preference detection device 3, a timer 4, a stay condition detecting device 5 and a moving condition detecting device 6.

In the memory 1, physical positions of shops, names of shops, minimum time necessary for regarding that a user stays the shop, number of times, in which user stays the shop are stored are stored with correspondence in a form of a correspondence table and program for operating a preference Information collecting system are also stored.

The position identification device 2 notifies a current position of the user to the preference detection device 3. The preference detection device 3 detects the preference information of the user and records the result in the correspondence table of the memory 1. The timer 4 measures an elapsed time. A stay condition detection device 5 detects stay start condition of the user. A moving condition detection device 6 detects moving start condition of the user.

The position identification device 2 can be realized by the GPS or a position detection service or the like typically provided in a mobile communication, such as pseudollite, Personal Handyphone System (PHS) or so forth. The most primitively, it can be manually input by the user with checking longitude and latitude of the current position with reference to a map. Namely, the present invention does not established under the premise of particular method.

The timer 4 may be a clock with a timer measuring a normal time. In case of the automotive vehicle, the stay condition detection device 5 can be realized by measuring a rotating condition of vehicular wheel or ON or OFF state of the engine. For instance, when a rotation value of the vehicular wheel is held "0" for a given period (e.g. 5 minutes at the shortest), or when OFF state of the engine is detected, the stay condition detection device 5 detects that stay condition is started, to notify.

When the user possessing a portable terminal built-in the GPS is moving on foot, it may be judged that the stay condition is started for notifying when the position information by the GPS is held unchanged for the given period (e.g. 5 minutes at the shortest).

Similarly, in case of the vehicle, the moving condition detection device 6 may be realized by a device detecting rotating condition of the vehicular wheel or by detecting ON or OFF condition of the engine. Namely, when the rotation value of the vehicular wheel becomes other than "0" or ON state of the engine is detected, the moving condition detection device 6 detects that the vehicle is moving to notify.

When the user possessing a portable terminal built-in the GPS is moving on foot, moving condition of the user may be detected when the position information by the GPS is varied within the given period (e.g. 5 minutes at the shortest) after staying condition, starting of the moving condition is notified.

FIG. 2 is an illustration showing a construction of the correspondence table stored in the memory 1. In FIG. 2, the correspondence table 1a includes a shop position portion 1b storing physical positions of the shops, a shop name portion 1c storing the shop names, a minimum stay time portion 1d storing minimum time to regard that the user stays in the shop, staying times portion 1e recording the most recent information of number of times where the user stayed in the shop, and a type portion 1f storing type of the shop.

The shop position portion 1b, the shop name portion 1c, the minimum stay time portion 1d, the stay times portion 1e and the type portion 1f are stored as one record per shop in a form of relational database or spread sheet.

In the shop position portion 1b, the physical positions of the shops are stored in a form of latitude and longitude ("latitude X1, longitude Y1", "latitude X2, longitude Y2", "latitude X3, longitude Y3" and "latitude X4, longitude Y4"). In the shop name portion 1c, the shop names ("hamburger shop A", "tennis court B", "game center C", French Restaurant D") are stored.

In the minimum stay time portion 1d, preliminarily set minimum time or period necessary to regard that user stays the relevant shop (e.g. "10 min.", "30 min.", "60 min.") is stored. In the stay times portion 1e, most recent information of number of times that the user stayed the relevant shop (e.g. "15", "2", "7", "5") is stored.

Type of the relevant shop (e.g. "restaurant", "sport", "game hall") to be stored in the type portion 1f may be preliminarily determined by the designer of the system. Therefore, for each shop, the most appropriate type for expressing the shop will be selected among preliminarily determined types.

Figure 3:
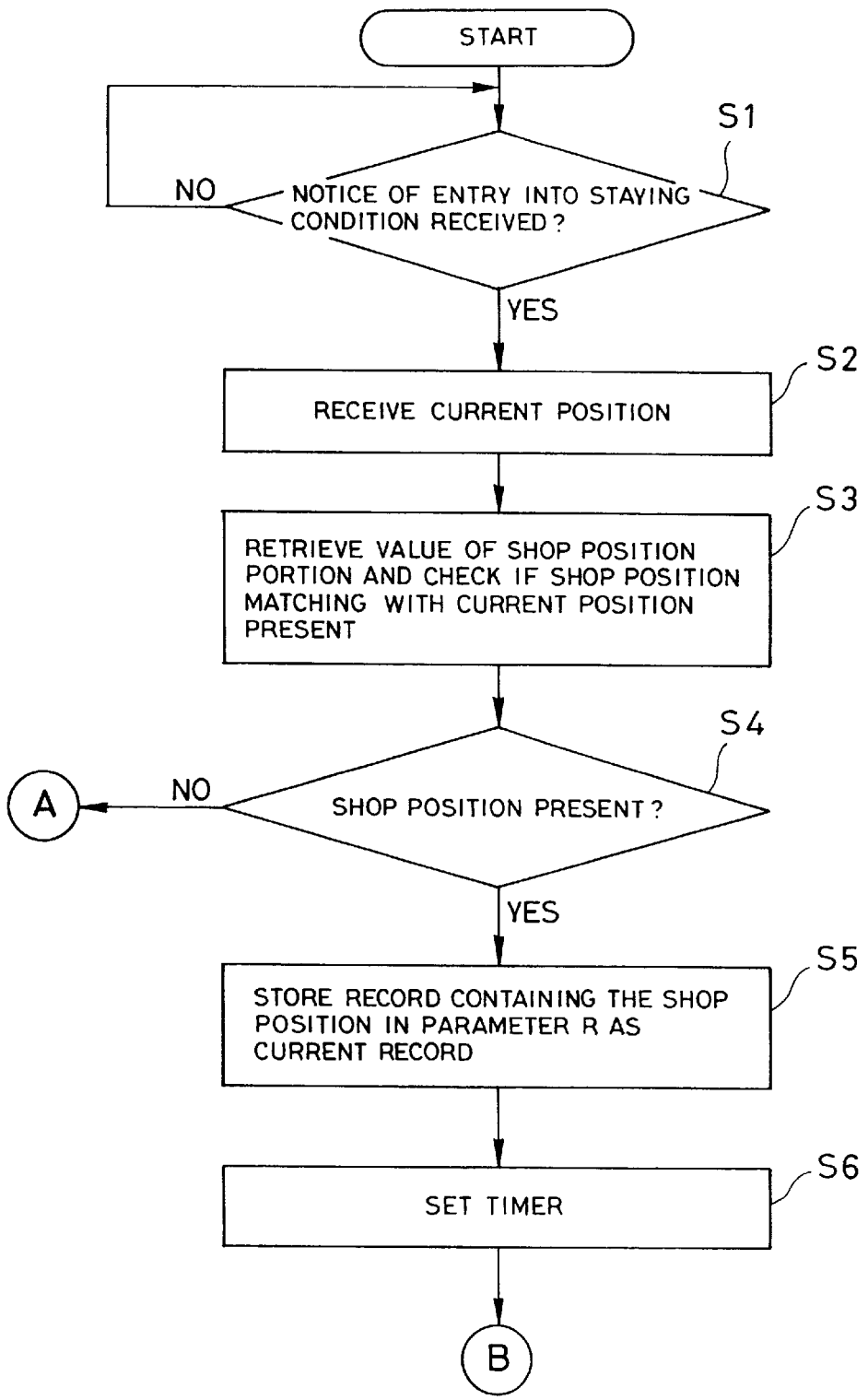
FIG. 3 is a flowchart showing process operation of a preference detection device of FIG. 1.
Figure 4:
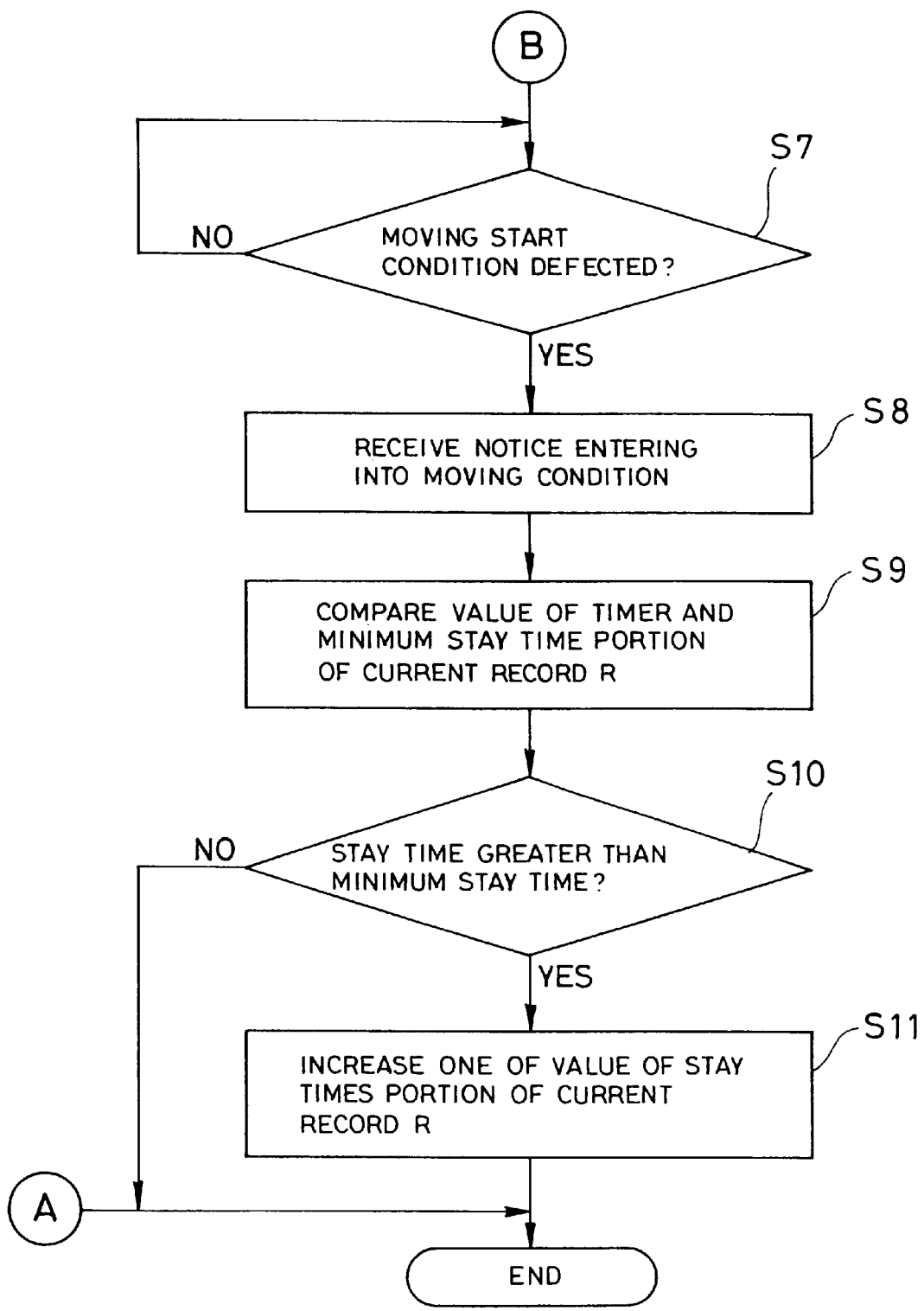
FIG. 4 is a flowchart showing process operation of the preference detection device of FIG. 1.
Figure 5:
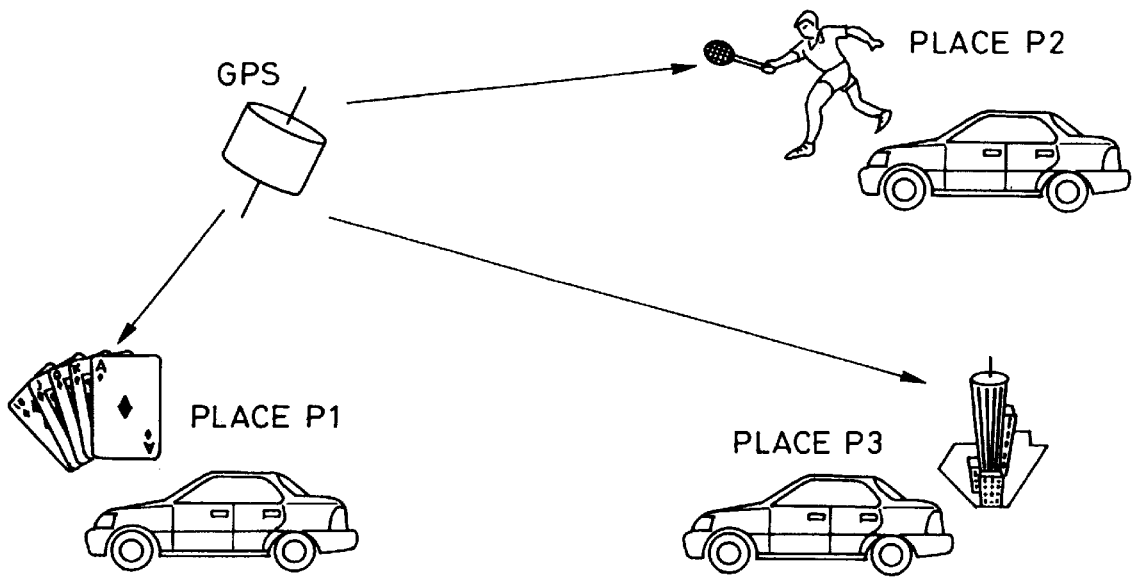
FIG. 5 is an illustration showing operation of one embodiment of the present invention.

FIGS. 3 and 4 are flowcharts showing process operation of the preference detection device 3 in FIG. 1, and FIG. 5 is an illustration showing operation of one embodiment of the present invention. The process operation of the preference detection device 3 of FIG. 1 will be discussed with reference to FIGS. 1 to 5. It should be noted that the process operation shown in FIGS. 3 and 4 are realized by the preference detection device 3 executing the program in the memory 1. In such case, as the memory 1, ROM (read-only-memory), IC (integrated circuit) memory and so forth may be useful.

The preference detection device 3 is responsive to the stay condition detection device 5 outputting a notice indicative of entry into staying condition (step S1 of FIG. 3), to receive the current position information from the position identification device 2 (step S2 of FIG. 3) to retrieve value in the shop position portion 1b of the correspondence table 1a for checking whether a shop matching with the current position is present or not (step S3 of FIG. 3).

Namely, as shown in FIG. 5, if the current position is the position P1, the type of the shop is "play hall", if the current position is the position P2, the type of the shop is "sporting facility", and if the current position is the position P3, the type of the shop is "shopping mall".

If any shop is present at the current position (step S4 of FIG. 3), the preference detection device 3 stores the record corresponding to the retrieved shop in a parameter R as a current record (step S5 of FIG. 3). Then, timer is set (step S6 of FIG. 3). Thereafter, the preference detection device 3 enters into waiting state for waiting the forthcoming event. If the no shop is retrieved at the current position as checked at step S4 of FIG. 3, the process goes end.

The preference detection device 3 is responsive to the moving condition detection device 6 outputting a notice indicative of moving start (steps S7 and S8 of FIG. 4) to compare the value of the timer 4 with the minimum stay time of the relevant shop (step S9 of FIG. 4). If the value of the timer 4 is greater than or equal to the minimum stay time as checked at step S10 of FIG. 4, the value of the stay time portion 1e of the current record is incremented by one (step S11 of FIG. 4). Then, process goes end. On the other hand, if the value of the timer 4 is smaller than the minimum stay time as checked at step S10 of FIG. 4, the preference detection device 3 directly terminates the process.

By this, number of times of staying at the relevant shop is incremented by one if the user stayed longer than or equal to the minimum stay time. It should be noted that the shop name portion 1c is not essential element for foregoing one embodiment of the present invention. However, since the shop name is required in normal use, the shop name is added as component.

Figure 6:
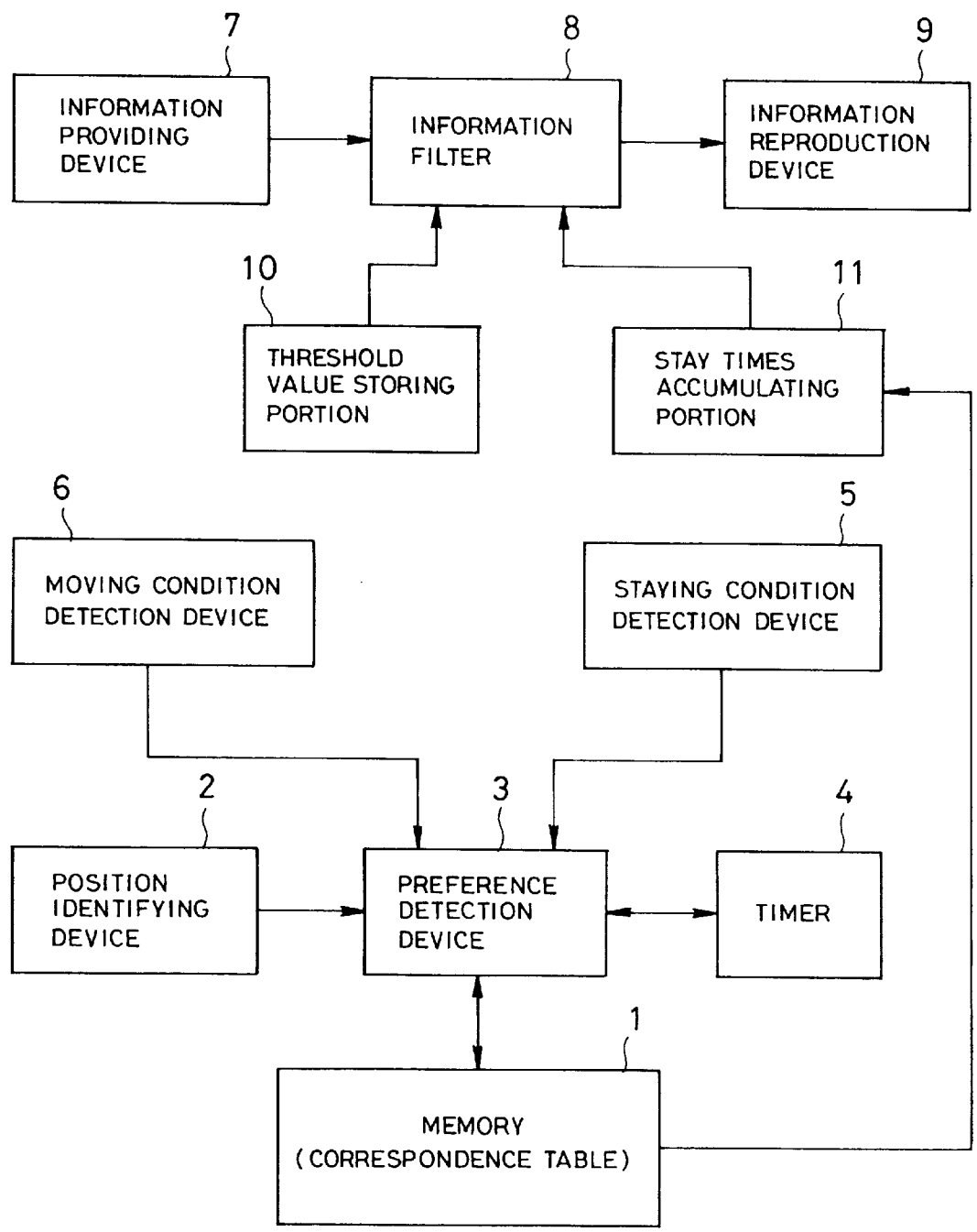
FIG. 6 is a block diagram showing a construction of another embodiment of the preference information collection system according to the present invention.

FIG. 6 is a block diagram showing a construction of another embodiment of the preference information collecting system according to the present invention. In FIG. 6, the preference information collecting system includes an information providing device 7, an information filter 8, an information reproducing device 9, a threshold value storing portion 10 and a stay times accumulating portion 11 in addition to the components in the former embodiment of the present invention. In the following disclosure, like components to those in the former embodiment will be identified by like reference numerals. Operations of such common components should be the same or similar to those in the former embodiment. Therefore, detailed discussion for these common embodiment will be omitted for avoiding redundant discussion to keep the disclosure simple enough to facilitate clear understanding of the present invention.

The information providing device 7 provides information by adding a type information to a contents (such as still image, moving picture, sound and other information contents). The information filter 8 receives a pair of the content and the type information (information of type of shop) of the content from the information providing device 7 to select only information matching with the preference of the user for outputting. The information reproducing device 9 receives the output of the information filter 9 to present the information to the user.

The threshold value storing portion 10 stores necessary minimum number of accumulated stay times to regard as preferred information of the user. The stay times accumulating portion 11 sums the value of the stay times portion 1e per the type indicated in the type portion 1f and contends a pair of a time name item and the stay times accumulated value as stored information.

The information proving device 7 provides the content obtained from a ground wave digital broadcasting, a satellite digital broadcasting, a wired internet, a radio internet and other means, with type (type of shop) of the content, to the information filter 8. It should be noted that the wired internet and radio internet are assumed to provide the same or equivalent information (contents) as that provided by the ground wave digital broadcasting or satellite digital broadcasting.

The information reproducing device 9 reproduces information provided from the information filter 8 depending upon kind of the content (e.g. audio, video or the like) in a form useful for the user. The value of the stay times accumulating portion 11 is derived on the basis of the contents of the type portion 1f and the stay times portion 1e every time of updating of the value of the stay times portion 1e.

FIG. 7 is an illustration showing a construction of the stay times accumulating portion 11 of FIG. 5. In FIG. 7, the stay times accumulating portion 11 is consisted of the type name section 11a storing the type name (e.g. "restaurant", "sport", "play hall") and a stay times accumulated value section 11b storing the accumulated value of the stay times ("20", "2", "7") per type.

FIG. 8 is a flowchart showing process operation of the information filter 8 of FIG. 6. The process operation of the information filter 8 of FIG. 6 will be discussed with reference to FIGS. 6 to 9. The process operation shown in FIG. 8 can be realized by the information filter 8 executing the program stored in the memory 1. As the memory, ROM, IC memory and so forth may be used.

The information filter 8 receives a pair of the content and the type information of the content (step S21 of FIG. 8) from the information providing device 7 and stores the content in a parameter C and the type information in a parameter T (step S22 of FIG. 8). Then, the type name section 11a of the stay time accumulating portion 11 is scanned downwardly from the upper side to retrieve the type name matching with the type information of the received content (step S23 of FIG. 8).

When the type name matching with the type information of the content is present (step S24 of FIG. 8), the information filter 8 stores the value of the stay time accumulating portion 11b corresponding to the matched type name in a parameter V (step S25 of FIG. 8). Then, the value of the parameter V and the value of the threshold value storing portion 10 are compared (step S26 of FIG. 8). Here, if the type name matching with the type information of the content is not present, the process does end.

When the value of the parameter V is greater than or equal to the value of the threshold value storing portion 10 (step S27 of FIG. 8), the content received from the information providing device 7 (value of the parameter C) is transferred to the information reproducing device 9 (step S28 of FIG. 8), and then the process goes end. On the other hand, if the value of the parameter V is smaller than the threshold value in the threshold value storing portion 10, the information filter 8 terminates the process (see FIG. 9).

As set forth above, by constantly monitoring information where the user goes, the preference information of the user can be obtained automatically. Namely, without requiring the user to input a conditional expression for selecting own necessary information, the preference information of the user can be obtained automatically from information of the sites to move and stay.

On the other hand, by using the preference information of the user obtained automatically, only necessary information can be selected and provided from internet, digital broadcasting and so forth. Thus, without requiring the user to pay attention, providing information adapted to the preference of the user can be realized. Particularly, for the driver of the vehicle varying time, place and necessary contents from time to time, PUSH type information providing mechanism can be advantageously realized.

It should be noted that while the foregoing embodiments of the present invention has been discussed under the premise that the user is moving on the vehicle, the present invention is equally applicable for the case of moving on foot, train, airplane or the like.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A preference information collecting system adapted for detecting staying of terminal equipment which is movable and position information of which is obtainable and collecting preference information of a user of said terminal from kind of a site where the terminal equipment stays, comprising:

a correspondence table storing a physical position of said site, type of a shop presenting on said site, a preliminarily set minimum time required for regarding that the terminal equipment stays said site, and the latest information of number of times of stay of said terminal equipment at said site, with correspondence thereof;

a position identifying device detecting a current position of said terminal equipment;

a stay condition detection device detecting a stay start condition of said terminal equipment;

a moving condition detection device detecting moving start condition of said terminal equipment; and a preference detection device comparing a period from detection of said stay start condition by said stay condition detection device to detection of said moving start condition of said moving condition detection device and a value of said minimum time of said correspondence corresponding to a current position indicated by said position identifying device, and updating the latest information of number of times of stay of said correspondence table corresponding to a current position indicated by said position identifying device depending upon a result of comparison.

2. A preference information collecting system as set forth in claim 1, wherein said position identifying device is constructed with a receiver of one of a global positioning system and a positioning system comparable with said global positioning system.

3. A preference information collecting system as set forth in claim 1, wherein said terminal equipment is mounted on an automotive vehicle.

4. A preference information collecting system as set forth in claim 3, wherein said stay condition detection device detects stay start condition of said terminal equipment from one of rotating condition of vehicular wheel and ON and OFF condition of an automotive engine.

5. A preference information collecting system as set forth in claim 3, wherein said moving start condition detection device detects stay start condition of said terminal equipment from one of rotating condition of vehicular wheel and ON and OFF condition of an automotive engine.

6. A preference information collecting system as set forth in claim 1, which further comprises:

a stay times accumulating portion accumulating a stay times corresponding to a type of the shop in said correspondence table and recording an accumulated stay times per type of the shop;

an information providing device receiving a pair of a contents at least including still image, moving picture and sound and a type of the shop of the content and providing information through a communication path;

a threshold value storing portion storing a preliminarily set minimum number of an accumulated number of times of stay;

an information filter responsive to said pair of the content and the type of the shop of the content from said information providing means for outputting said content depending upon a result of comparison between number of times of stay in said stay times accumulating portion corresponding to the type of said shop and a value of said threshold value storing portion; and an information reproducing device receiving an output of the information filter and presenting information to the user.

7. A preference information collecting system as set forth in claim 6, wherein said information providing device receives said content using at least one of a ground wave digital broadcasting, a satellite digital broadcasting, a wired internet, a radio internet.

8. A preference information collecting method adapted for detecting staying of terminal equipment which is movable and position information of which is obtainable and collecting preference information of a user of said terminal from kind of a site where the terminal equipment stays, comprising:

a step of providing a correspondence table storing a physical position of said site, type of a shop presenting on said site, a preliminarily set minimum time required for regarding that the terminal equipment stays said site, and the latest information of number of times of stay of said terminal equipment at said site, with correspondence thereof;

a step of making judgment whether said terminal equipment enters into stay start condition;

a step of detecting a current position of said terminal equipment upon entry into stay start condition of said terminal equipment;

a step of retrieving said correspondence table with a current position of said terminal equipment;

a step of detecting moving start condition of said terminal equipment;

a step of comparing a period from detection of said stay start condition by said stay condition detection device to detection of said moving start condition of said moving condition detection device and a value of said minimum time of said correspondence corresponding to a current position indicated by said position identifying device; and a step of updating the latest information of number of times of stay of said correspondence table corresponding to a current position indicated by said position identifying device depending upon a result of comparison.

9. A preference information collecting method as set forth in claim 8, wherein said step of detecting the current position of said terminal equipment detects the current position of said terminal equipment on the basis of information from one of a global positioning system and a positioning system comparable with said global positioning system.

10. A preference information collecting method as set forth in claim 8, wherein said terminal equipment is at least mounted on an automotive vehicle.

11. A preference information collecting method as set forth in claim 10, wherein said step of detecting stay start condition detects stay start condition of said terminal equipment from one of rotating condition of vehicular wheel and ON and OFF condition of an automotive engine.

12. A preference information collecting method as set forth in claim 10, wherein said step of detecting moving start condition detects stay start condition of said terminal equipment from one of rotating condition of vehicular wheel and ON and OFF condition of an automotive engine.

13. A preference information collecting method as set forth in claim 8, which further comprises:

a step of accumulating a stay times corresponding to a type of the shop in said correspondence table and recording an accumulated stay times per type of the shop upon receiving a pair of a contents at least including still image, moving picture and sound and a type of the shop of the content and providing information through a communication path, and retrieving a stay times accumulating portion recording number of times of stay per shop in said correspondence table by a type of the shop of the content;

a step of comparing a stay times retrieved from said stay times accumulating portion with a preliminarily set minimum number of an accumulated number of times of stay;

a step of outputting said content depending upon a result of comparison.

14. A preference information collecting method as set forth in claim 13, wherein said content is received using at least one of a ground wave digital broadcasting, a satellite digital broadcasting, a wired internet, a radio internet.

15. A storage medium storing a preference information collection control program for operating a preference information collecting system adapted for detecting staying of terminal equipment which is movable and position information of which is obtainable and collecting preference information of a user of said terminal from kind of a site where the terminal equipment stays, said preference information collecting system providing a correspondence table storing a physical position of the site, type of a shop presenting on the site, a preliminarily set minimum time required for regarding that the terminal equipment stays the site, and the latest information of number of times of stay of the terminal equipment at the site, with correspondence thereof, said preference information collection control program operating said preference information collecting system for making judgment whether said terminal equipment enters into stay start condition;

for detecting a current position of said terminal equipment upon entry into stay start condition of said terminal equipment;

for retrieving said correspondence table with a current position of said terminal equipment;

for detecting moving start condition of said terminal equipment;

for comparing a period from detection of said stay start condition by said stay condition detection device to detection of said moving start condition of said moving condition detection device and a value of said minimum time of said correspondence corresponding to a current position indicated by said position identifying device; and for updating the latest information of number of times of stay of said correspondence table corresponding to a current position indicated by said position identifying device depending upon a result of comparison.

16. A storage medium recording a preference information collection control program as set forth in claim 15, wherein said preference information collecting control program operates said preference information collection system for accumulating a stay times corresponding to a type of the shop in said correspondence table and recording an accumulated stay times per type of the shop upon receiving a pair of a contents at least including still image, moving picture and sound and a type of the shop of the content and providing information through a communication path, and retrieving a stay times accumulating portion recording number of times of stay per shop in said correspondence table by a type of the shop of the content;

for comparing a stay times retrieved from said stay times accumulating portion with a preliminarily set minimum number of an accumulated number of times of stay; and for outputting said content depending upon a result of comparison.

\* \* \* \* \*